Oct. 10, 1933.  J. C. SMITH ET AL  1,930,153
STENCILING METHOD AND APPARATUS
Filed Aug. 26, 1932  2 Sheets-Sheet 1
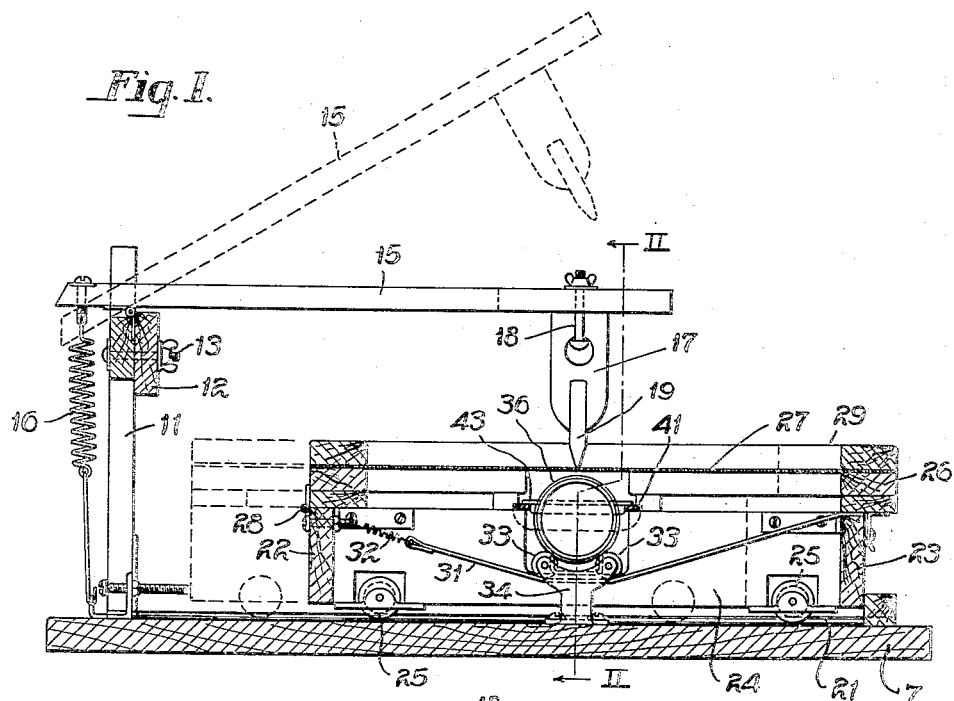
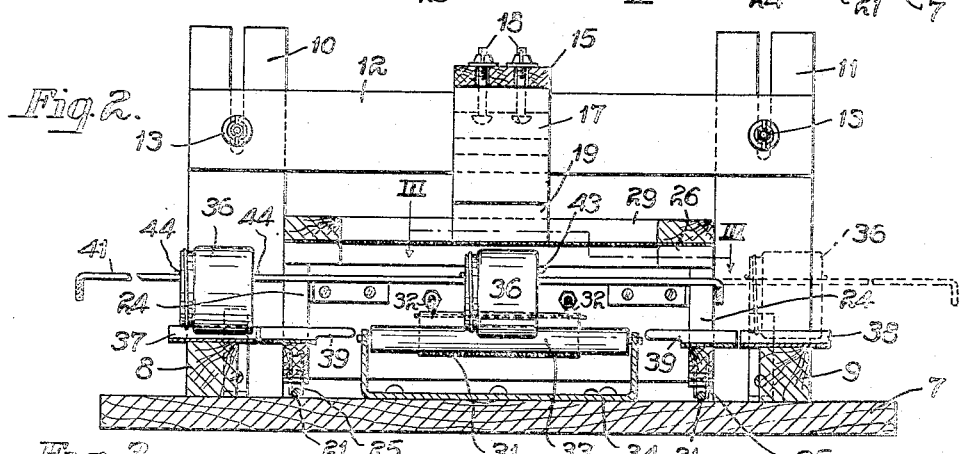
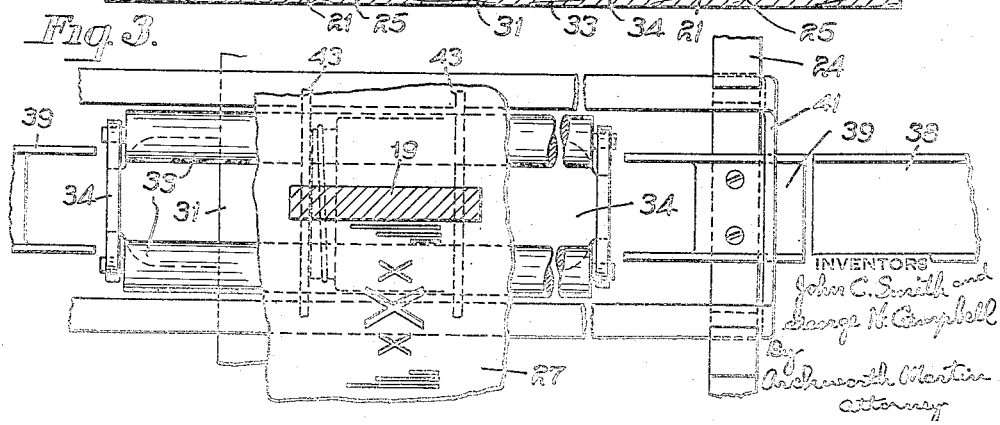

Patented Oct. 10, 1933

1,930,153

UNITED STATES PATENT OFFICE 1,930,153

STENCILING METHOD AND APPARATUS

John C. Smith and George H. Campbell, Monaca, Pa., assignors to Solar Laboratories, Monaca, Pa., a corporation of Pennsylvania Application August 26, 1932. Serial No. 630,484

9 Claims. (Cl. 101—124)

Our invention relates to a stenciling method and apparatus, and particularly to the lettering and decorating of articles of glassware and various other objects.

This invention constitutes an improvement upon that disclosed in our copending application, Serial No. 621,628, filed July 9, 1932, and is directed to a manner in which articles having curved or circular faces may be lettered and decorated.

Another object of our invention is to provide an improved means for positioning articles beneath a screen or the like.

A further object of our invention is to provide an improved means for imparting relative rotative movement as between the article to be decorated and an implement for causing the application of decorative material thereto.

Still another object of our invention is to provide a stenciling and decorating apparatus of generally simplified and improved form, and which may be operated more rapidly than various types of apparatus heretofore employed.

Figure 4:
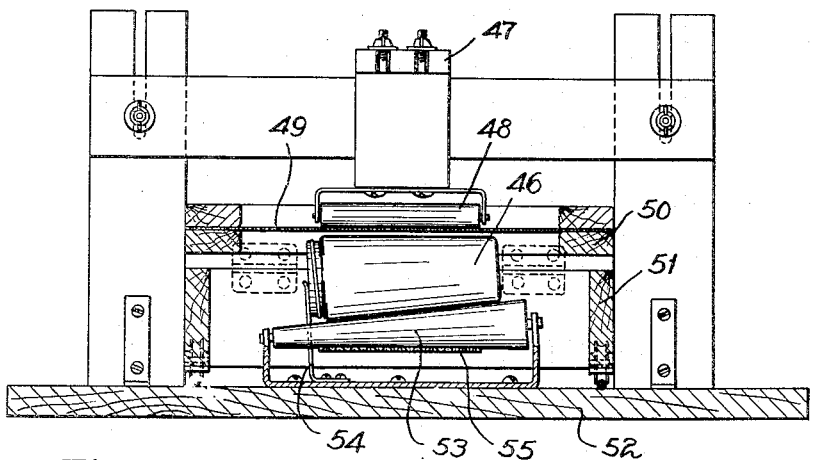
Figure 5:
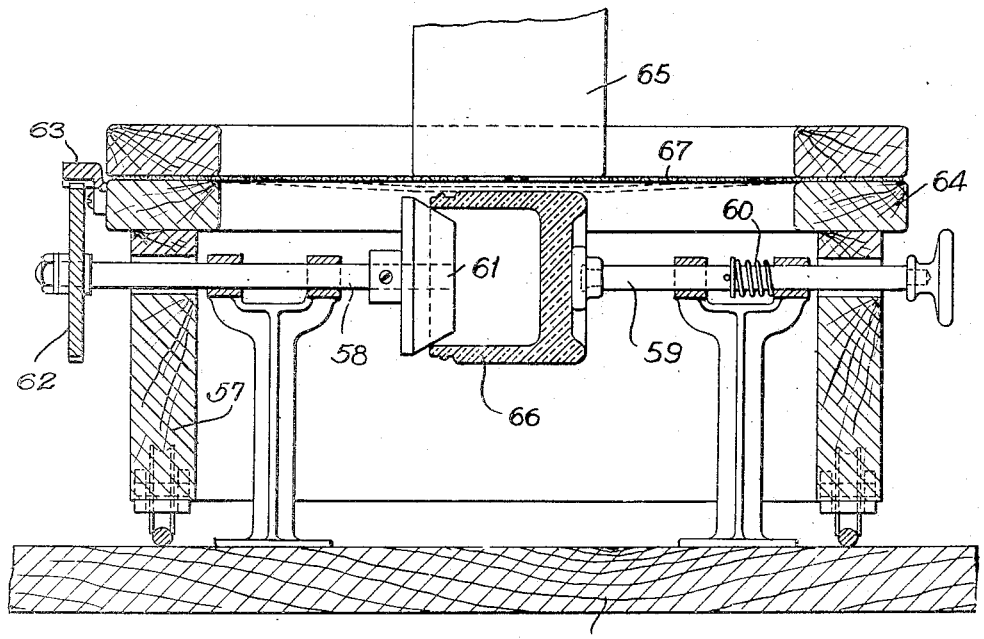

Various ways of practising our invention are shown on the accompanying drawings wherein Figure 1 is a longitudinal sectional view of a stenciling apparatus; Fig. 2 is a view taken on the line II—II of Fig. 1; Fig. 3 is a view, on an enlarged scale, taken on the line III—III of Fig. 2; Fig. 4 is a view similar to Fig. 2, but showing a modified form of apparatus, and Fig. 5 is a similar view showing still another modification.

Referring first to Figs. 1, 2 and 3, we show a framework or holder consisting of a base board 7 having side bars 8 and 9, and uprights 10 and 11, the uprights carrying a cross bar 12. The cross bar 12 is vertically adjustable with respect to the uprights 10 and 11, by means of bolts 13, that extend through vertical slots in the uprights, and through the cross bar. The bolts are provided with wing nuts which may be tightened to maintain the cross bar at desired positions of vertical adjustment.

A squeegee-supporting arm 15 is hingedly connected to the cross bar 12, and is normally held in raised position, as shown by dotted lines in Fig. 1, by a tension spring 16. The arm 15 carries a squeegee-supporting block 17 that is connected to the arm by bolts 18 having wing nuts for the purpose of effecting clamping engagement between the members 15 and 17. The bar 15 has longitudinal slots at its end through which the bolts 18 extend, so that the block 17 can be adjusted longitudinally of the bar. A rubber squeegee 19 is mounted in the lower end of the block 17.

The base 7 is provided with trackways 21 that support a carriage having front and rear end walls 22 and 23, respectively, and side walls 24, that are rigidly connected in box-like form. Wheels 25 are journalled at the lower edges of the side walls 24 and roll on the tracks 21. A frame 26 for supporting a stencil sheet 27 is hingedly connected at 28 to the carriage, so that when the bar 15 is in its raised position, the screen frame 26 may be raised to permit of access to the interior of the carriage. A clamping frame 29 is connected to the frame 26 by screws or other suitable means, and serves to retain the stencil sheet 27 in position.

A band or belt 31 is secured at one end to the end wall 23 of the carriage or box, and at its other end is connected by springs 32 to the end wall 22 of the carriage, the purpose of the springs 32 being to maintain the band taut at various positions of movement of the carriage, as hereinafter explained.

A pair of rollers 33 are journalled in a bracket 34 that is secured to the base 7, and the belt 31 is disposed against the undersides of these rollers and maintained in frictional engagement therewith by the springs 32, so that as the carriage is moved back and forth on the tracks 21, the rollers will be rotated to revolve a jar or other article 36 that is positioned on the rollers.

The manner in which the articles are positioned upon and discharged from the rollers 33 will now be described.

Slideways 37 and 38 are secured to the side boards 8 and 9, respectively, in position to initially receive articles 36. A pair of slideways 39 are mounted in the side walls 24 of the carriage, such walls being cut away above the slideways to permit movement of the articles 36 through said walls. Above the slideways 39, a yoke-like slide bar 41 is slidably supported in the walls 24, the ends of the slide bar 41 being bent down, as shown more clearly in Fig. 2, to limit sliding movement thereof in each direction. Two pairs of cross bars or wires 43 and 44 are secured to and bridge the legs of the slide bar 41, to maintain the articles 36 in proper position relative to said slide bar during movement thereof.

As viewed in Fig. 2, it will be seen that with the jars 36 in the full-line positions shown therein, sliding movement of the bar 41 to the right, will move one jar 36 from beneath the squeegee 19 to the dotted line position, and simultaneously bring the other jar 36 into position beneath the squeegee. The jar 36 at the dotted line position in said Figure, can be removed, and another jar inserted, it being understood of course that the jar 36 that lies beneath the squeegee is decorated while in such position, as hereinafter described.

Movement of the slide bar to the left will remove the second decorated jar from beneath the squeegee and bring an undecorated jar from the dotted line position into position beneath the squeegee to be decorated. The slideways 37, 38 and 39 serve to support and guide the jars in their movements to and from position beneath the squeegee, the slideways being in approximately horizontal alinement with the rollers 33.

The stencil sheet 27 may suitably be of the well-known screen stencil type, that has the lettering or other decorating design outlined by perforations, at least some of the perforations being preferably so closely spaced that ink forced therethrough from the upper side of the sheet will coalesce upon the surface of the article to form continuous lines or fields, especially in the case of lettering. The stencil sheet may be of parchment, silk, or other flexible material.

It will be understood that ink or the like is placed upon the upper surface of the stencil 27 in position to be forced through the perforations by the squeegee 19 when the carriage is moved back and forth. The sheet 27 is flexible, but held taut, so that it will be sustained in a plane above the uppermost surface of the article when the squeegee is out of contact therewith. When the squeegee bar 15 is lowered, and slight pressure applied thereto, it will deflect the sheet downwardly against the article 36. Movement of the carriage will cause the belt 31 to rotate the rollers 33, and consequently the article 36, such rotative movement at the uppermost plane of the article 36 being in the direction of traveling movement of the screen 27, so that the contacting surfaces of the screen 27 and the article will travel in the same direction, and at the same rate of speed. Simultaneously, the squeegee 19 which has no traveling movement will force ink or other decorating material through the screen and against the surface of the article 36.

When the bar 15 is released by the operator, it will swing to its dotted line position (Fig. 1), thus allowing the sheet 27 to spring up out of contact with the article. Thereupon, the slide 41 can be operated to slide the decorated article 36 out of the carriage, and simultaneously bring an undecorated article into position to be coated.

It will be seen that the curved surface of the article can be conveniently decorated without smudging, and that the operation of decorating the articles may be quickly and conveniently performed, without the necessity of lifting the screen frame 26 after each operation, for the purpose of placing and removing the articles, as is common in mimeograph and stenciling work.

Furthermore, the articles are definitely and accurately positioned beneath the stenciling sheet, by reason of the retaining wires 43 that maintain the articles in fixed position relative to the slide bar 41, and the down-turned ends of the slide bar that serve as stops to limit sliding movement thereof.

Referring now to Fig. 4, we show an arrangement whereby tapered articles 46 may be operated upon. In this structure, a squeegee supporting arm 47 is mounted upon a stationary framework in a manner similar to that in which the arm 15 is mounted, a squeegee roller 48 being substituted however, for the squeegee plate 19 of Fig. 1. Either rollers or blades may be employed in either instance, as may be desired, the squeegee element being, of course, preferably of some yieldable material such as rubber or printers' roll material.

The stencil sheet 49 is supported on a frame 50 that is hinged to a carriage 51, these members being similar to the corresponding elements of Fig. 1.

On the stationary base 52 that supports the carriage 51, we mount a pair of tapered rollers 53, that, except for their tapered construction, are similar to the rollers 33. The taper or inclination of the rollers is such as to correspond to the taper of the article 46, whereby the uppermost surface of the article is presented on a line that is horizontal or parallel to the adjacent surface of the stencil sheet 49. A stop member 54 serves to hold the article 46 in proper position upon the rolls 53.

A belt 55 passes beneath the rollers 53 and is secured at its ends to the carriage 51, as in the case of the belt 31, so that as the carriage is reciprocated, the rollers will be rotated and turn the articles, to permit the application of paint or the like thereto, as described heretofore. In this structure, the articles are inserted and removed by lifting the screen frame 50.

In Fig. 5, we show another manner in which the articles may be supported and rotated. In this structure, a reciprocably-mounted frame 57 is provided, through slotted sides thereof extend a shaft 58 and a push bar 59, suitably supported in axial alignment from the base 68, the bar 59 being normally urged inward by a spring 60. The shaft 58 carries a tapered chuck member 61 of rubber or the like at its inner end and at its outer end has secured thereto a gear or toothed wheel 62 that meshes with a toothed rack bar 63 movable with the frame 57. The frame 57 carries a screen holder 64, and a stationary squeegee 65, corresponding to the squeegees 19 and 48, is positioned above the screen and may be supported from the base 68. To permit insertion and removal of the articles, the plunger bar 59 is pulled outwardly, and when it is released it will maintain an article in snug engagement with the chuck 61. Traveling movement of the carriage 57 will effect rotation of the shaft 58, the article 66, and the bar 59. The screen 67 will, of course, move with the carriage as explained in a discussion of Figs. 1 and 3, so that the ink may be forced through the screen and against the surface of the article. The squeegee 65 is, of course, raised to permit the screen 67 to move out of engagement with the article, so that the article can be removed. This removal may be effected either by raising the screen frame 64, or by the operator working through an open end of the carriage 57.

While we have herein described our invention in connection with screen stenciling, it will be understood that other forms of stencil may be employed, and that instead of applying stenciling ink to the articles, they may be coated with an acid-resistant material when the articles to be etched are placed in an acid bath. Also, they may be similarly coated with a material which will be resistant to sand-blasting, in those cases where the uncoated portions of the articles are to be subjected to a sand blast.

The term "ceramic" as employed in the claims hereof is intended to include baked clay ware as well as glass ware.

We claim as our invention:—

1. The method of stenciling the periphery of a curved ceramic article, which comprises bringing one side of a substantially flat stencil sheet or the like into engagement with the surface of the article, imparting a rolling movement to the article and forcing imprinting material through the sheet from the opposite side thereof, by a wiping action.

2. Stenciling apparatus comprising a stencil sheet, means beneath said sheet for supporting an article to be imprinted, and a reciprocably-mounted slide device disposed beneath the stencil sheet and adapted to engage an article to effect movement thereof into and out of operative position beneath the stencil sheet.

3. Stenciling apparatus comprising a stencil sheet, means beneath said sheet for supporting an article to be imprinted, a slide device operable from opposite edges of the stencil sheet, and article-engaging members spaced longitudinally of said device to effect movement of the articles to and from beneath the stencil sheet during sliding movement of the device.

4. Stenciling apparatus comprising a fixed support for a pair of article-supporting rollers, a slidably-mounted frame for supporting a stencil sheet, and a belt having its ends connected to the ends of said frame and having frictional engagement with said rollers.

5. Stenciling apparatus comprising a stationary frame having side bars and a base, article-supporting rollers mounted on said base, a carriage disposed above the base and adapted to carry a stencil sheet in position above said rollers, means for rotating said rollers during traveling movement of the carriage, and slide-ways positioned at the ends of said rollers, for directing articles into position on the rollers.

6. Stenciling apparatus comprising a stationary frame having side bars and a base, atricle-supporting rollers mounted on said base, a carriage disposed above the base and adapted to carry a stencil sheet in position above said rollers, means for rotating said rollers during traveling movement of the carriage, slide-ways positioned at the ends of said rollers for directing articles into position on the rollers, one of said slide-ways being mounted on the carriage and the other slideway being positioned on the said frame in parallelism with the first-named slideway.

7. Stenciling apparatus comprising a tapered roller positioned beneath and supporting a tapered article, with the tapers of the roller and the article being oppositely disposed, and a stencil sheet positioned in proximity to and above the article.

8. The method of stenciling the periphery of a curved ceramic article, which comprises positioning a stencil sheet or the like in tangential relation to the curved surface of the article, imparting a rolling movement to the article along the adjacent surface of the sheet, and simultaneously introducing coating material through the sheet and against the article to a depth approximately equal to the thickness of the sheet.

9. The method of stenciling the periphery of a curved ceramic article, which comprises positioning a stencil sheet or the like in tangential relation with the curved surface of the article, the sheet having closely spaced holes cooperating to form the field of the character to be produced, imparting rolling movement to the article along the adjacent surface of the sheet, and simultaneously introducing stenciling material through the sheet and against the said surface, the material being deposited to a depth that the deposited particles thereof will unite when the coated surface of the article passes out of engagement with the sheet.

JOHN C. SMITH.
GEORGE H. CAMPBELL.